United States Patent
St. Pierre (10) Patent No.: US 11,601,369 B1
(45) Date of Patent: Mar. 7, 2023

(54) MITIGATION OF NETWORK ATTACKS BY PRIORITIZING NETWORK TRAFFIC

(71) Applicant: Arbor Networks, Inc., Westford, MA (US)

(72) Inventor: Brian St. Pierre, Acworth, NH (US)

(73) Assignee: Arbor Networks, Inc., Westford, MA (US)

( * ) Notice: Subject to any disclaimer, the term of this patent is extended or adjusted under 35 U.S.C. 154(b) by 0 days.

(21) Appl. No.: 17/464,177

(22) Filed: Sep. 1, 2021

(51) Int. Cl.
  *G06F 15/16* (2006.01)
  *H04L 47/2441* (2022.01)
  (Continued)

(52) U.S. Cl.
  CPC ........ *H04L 47/2441* (2013.01); *H04L 47/122* (2013.01); *H04L 47/215* (2013.01); *H04L 47/2433* (2013.01); *H04L 47/2483* (2013.01)

(58) Field of Classification Search
  CPC ............. H04L 47/2483; H04L 47/2433; H04L 47/215; H04L 47/122; H04L 47/2441; H04L 67/10; H04L 63/0428; H04L 47/20
  (Continued)

(56) References Cited

U.S. PATENT DOCUMENTS

| | | | | |
|---|---|---|---|---|
| 2006/0187839 A1* | 8/2006 | Smith | ................. | H04L 47/2441 370/252 |
| 2009/0103501 A1* | 4/2009 | Farrag | ................... | H04W 74/02 370/337 |

(Continued)

FOREIGN PATENT DOCUMENTS

| | | | | |
|---|---|---|---|---|
| WO | WO-0041368 A2 * | 7/2000 | ............. | H04L 47/10 |
| WO | WO-2007050283 A2 * | 5/2007 | ......... | H04L 12/2602 |

OTHER PUBLICATIONS

A WDM ring MAN architecture with traffic distribution and collisions avoidance for bandwidth utilization enhancement Peristera A. Baziana;Ioannis E. Pountourakis 2011 18th International Conference on Telecommunications Year: 2011 | Conference Paper | Publisher: IEEE (Year: 2011).*

(Continued)

*Primary Examiner* — Oscar A Louie
*Assistant Examiner* — Oluwatosin M Gidado
(74) *Attorney, Agent, or Firm* — Locke Lord LLP; Scott D. Wofsy; Christopher J. Capelli (57) ABSTRACT

A computer method and system for prioritizing network traffic flow to a protected computer network. Network traffic flowing from one or more external hosts to the protected computer network is intercepted and intercepted data packets are dropped if forwarding the intercepted data packet to the protected network would cause the value of the bandwidth of network traffic flow to the protected network to exceed a configured overall traffic bandwidth threshold value associated with the protected network. If not dropped, the intercepted data packet is analyzed to determine a classification type for the intercepted data packet based upon prescribed criteria wherein each classification type has an assigned classification bandwidth threshold value, wherein the classification bandwidth threshold value is less than the overall traffic bandwidth threshold value for the protected network. The intercepted data packet is dropped if forwarding the intercepted data packet would cause the value of the bandwidth of traffic flow to the protected network to exceed the bandwidth threshold value assigned to the determined classification type of the intercepted packets.

12 Claims, 3 Drawing Sheets

(51) Int. Cl.
  *H04L 47/2483*  (2022.01)
  *H04L 47/215*   (2022.01)
  *H04L 47/122*   (2022.01)
  *H04L 47/2425*  (2022.01)
(58) Field of Classification Search
  USPC .......................................................... 709/224
  See application file for complete search history.

(56) References Cited

U.S. PATENT DOCUMENTS

| | | | |
|---|---|---|---|
| 2009/0196176 A1* | 8/2009 | Nishimura | H04L 47/215 370/230.1 |
| 2009/0252219 A1* | 10/2009 | Chen | H04N 21/2402 375/E7.026 |
| 2018/0020016 A1* | 1/2018 | Hu | H04L 63/10 |
| 2019/0268230 A1* | 8/2019 | Huang | H04L 47/20 |

OTHER PUBLICATIONS

Efficient bandwidth utilization and congestion control through network traffic analysis Zhuo Jiang;Inwhee Joe The 5th International Conference on New Trends in Information Science and Service Science Year: 2011 | vol. 2 | Conference Paper | Publisher: IEEE (Year: 2011).*

Prioritized traffic recovery over GMPLS networks Yuanqiu Luo; N. Ansari IEEE/Sarnoff Symposium on Advances in Wired and Wireless Communication, 2005. Conference Paper | Publisher: IEEE (Year: 2005).*

* cited by examiner

MITIGATION OF NETWORK ATTACKS BY PRIORITIZING NETWORK TRAFFIC

FIELD OF THE INVENTION

The disclosed embodiments generally relate to prioritizing network traffic flow in a computer network, and in particular to metering packet flows for mitigating attacks on a computer network.

BACKGROUND

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

DoS mitigation techniques often include Deep Packet Inspection (DPI) which examines the contents of network packets received by a mitigation device to make a determination to meter certain network traffic flowing to a protected network/device (e.g., drop or pass packets in the network traffic flow). However, it is to be appreciated that metering techniques for determining on whether to drop vs. pass network traffic flow is typically not easy to define meaning that there is often a "gray area" where such a mitigation system has some probability it can be caused to drop legitimate network traffic flow.

Often during DoS mitigation it is known that a protected network/device has a maximum capability in terms of bits per second (bps), packets per second (pps), or connections per second (cps). The operator can configure a mitigation device to arbitrarily drop packets that exceed the configured rate. This technique is known as "rate limiting". A noted benefit of this technique is the operator ensures a protected service on a network/device will not experience excessive traffic, however a noted drawback is it likely to overmitigate, meaning legitimate network traffic flow will also be caused to be dropped.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, described is computer method and system for prioritizing network traffic flow to a protected computer network. Network traffic flowing from one or more external hosts to the protected computer network is intercepted and intercepted data packets are dropped, queued or marked as non-confirming if forwarding an intercepted data packet to the protected network would cause the value of the bandwidth of network traffic flow to the protected network to exceed a configured overall traffic bandwidth threshold value associated with the protected network. If not dropped, queued or marked, the intercepted data packet is analyzed to determine a classification type for the intercepted data packet based upon prescribed criteria wherein each classification type has an assigned classification bandwidth threshold value, wherein the classification bandwidth threshold value is less than the overall traffic bandwidth threshold value for the protected network. The intercepted data packet is dropped, queued or marked if forwarding the intercepted data packet would cause the value of the bandwidth of traffic flow to the protected network to exceed the bandwidth threshold value assigned to the determined classification type of the intercepted packets.

In other aspects, determining a classification type for the intercepted data packets includes determining a score value for the intercepted data packet based one or more contents of the intercepted data packets determined from inspection of the intercepted data packet, and analyzing the intercepted data packet includes determining if a reserved service threshold bandwidth classification, having an associated assigned reserve threshold bandwidth value, has been configured for the protected network. If yes, then a determination is made to whether the intercepted data packet belongs to the reserved service threshold bandwidth classification (the reserved service threshold bandwidth classification relates to a certain network service) such that if the overall bandwidth of traffic flow to the protected network exceeds the assigned reserve service threshold bandwidth value then only if the intercepted data packet is determined as belonging to the reserve service threshold classification will it be permitted to forward to the protected network.

In yet other aspects, analyzing the intercepted data packet further includes determining if one or more tiered threshold classifications have been configured for the protected network with each tiered threshold classification having an assigned tiered threshold bandwidth value. And if yes, then determine, based upon predetermined criteria, which of the one or more threshold classifications are associated with the determined score value for the intercepted data such that the intercepted data will only be permitted to forward to the protected network if the overall bandwidth of traffic flow to the protected network is less than the tiered threshold bandwidth value associated with the determined score value of the intercepted data packet.

In further aspects, analyzing the intercepted data packet further includes determining if one or more service threshold classifications (each service threshold classification relates to a certain network service) have been configured for the protected network with each service threshold classification having an assigned service threshold bandwidth value. And if yes, then determine whether the intercepted data packet belongs to the one or more service thresholds classifications such that if it is determined that the intercepted data packet belongs to the one or more service thresholds classifications, then the intercepted packet will only be permitted to forward to the protected network if the overall bandwidth of traffic flow to the protected network is less than the service threshold bandwidth value associated with the determined service threshold classification for the intercepted data packet.

In other aspects, a counter is associated with the bandwidth of network traffic flow to the protected network, which counter is increased when network traffic flow associated with the intercepted data packets is permitted to reach the protected network and the counter is periodically reset to zero, where the period represents the time period over which the traffic rate is measured. For example, the counter may be reset once per second for traffic measured in terms of bits or packets per second. And in some embodiments, the counter utilizes a token bucket algorithm whereby tokens are subtracted from a token bucket to represent network traffic flow to the protected network, and tokens are periodically added to the token bucket to represent the allowable traffic flow to the protected network over that time period.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings, in which certain illustrated embodiments are shown. The illustrated embodiments are not limited in any way as to what is shown as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the illustrated embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which the illustrated embodiments belong. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the illustrated embodiments are not to be limited by what has been particularly shown and described, except as indicated by the appended claims.

The present embodiments relate to a method, apparatus and system to identify and defend against malicious network attacks. In particular, the illustrated embodiments describe a system, device and method configured and operable to prioritize network data packets in a network traffic flow prior to reaching a traffic limiting component provided in a network attack mitigation device. Thus, the traffic limiting component is enabled to meter network packets according their prioritized classification so as to mitigate the occurrence of legitimate packets from being dropped, queued or marked by the traffic limiting component.

In particular, it is to be appreciated that rate limiting packets in a network traffic flow is often achieved using a well-known "token bucket algorithm" techniques. For instance, a token bucket is an algorithm often used in computer networks, which checks that data transmissions in the form of packets, conform to defined limits on bandwidth. It can also be used as a scheduling algorithm to determine the timing of transmissions that will comply with the limits set for the bandwidth. The token bucket algorithm is typically based on an analogy of a fixed capacity bucket into which tokens, normally representing a unit of bytes or a single packet, are added at a fixed rate. When a packet is checked for conformance to the defined limits, the bucket is inspected to see if it contains sufficient tokens at that time. If so, the appropriate number of tokens, e.g. equivalent to the length of the packet in bytes, are removed ("cashed in"), and the packet is passed (e.g., for transmission). The packet does not conform if there are insufficient tokens in the bucket, and the contents of the bucket are not changed. Non-conformant packets can be treated in various ways, such as: 1) they may be dropped; 2) they may be enqueued for subsequent transmission when sufficient tokens have accumulated in the bucket; and 3) they may be transmitted, but marked as being non-conformant, possibly to be dropped subsequently if the network is overloaded. A conforming flow can thus contain traffic with an average rate up to the rate at which tokens are added to the bucket. In other words, a bucket starts full of tokens; tokens are removed from the bucket to represent consumption of bandwidth; tokens are added to the bucket at a constant rate based on the configured bandwidth limit. It is to be appreciated that there are well-known variations on the token bucket, including creating hierarchical arrangements of the token buckets. It is to be appreciated that in accordance with the illustrated embodiments, the usage described herein utilizes a single "priority token bucket" with multiple limit thresholds, but performs different operations on the bucket depending on the classification of the packets that are consuming tokens. It is to be further appreciated that while the description below focuses mainly on the token bucket algorithm, there are other algorithms that could be used.

It is to also be understood that while the certain illustrated embodiments describe DDoS mitigation and Deep Packet Inspection (DPI) techniques performed by a mitigation device, the illustrated embodiments are not to be understood to be limited to such DDoS mitigation and Deep Packet Inspection (DPI) techniques, as the illustrated embodiments are also to be understood to also be applicable to Web Application Firewalls (WAF) which typically offer a rate limiting feature, and where the WAF engine may function similarly to the DPI inspection system and could perform marking/classification of requests as described further below.

Figure 1:
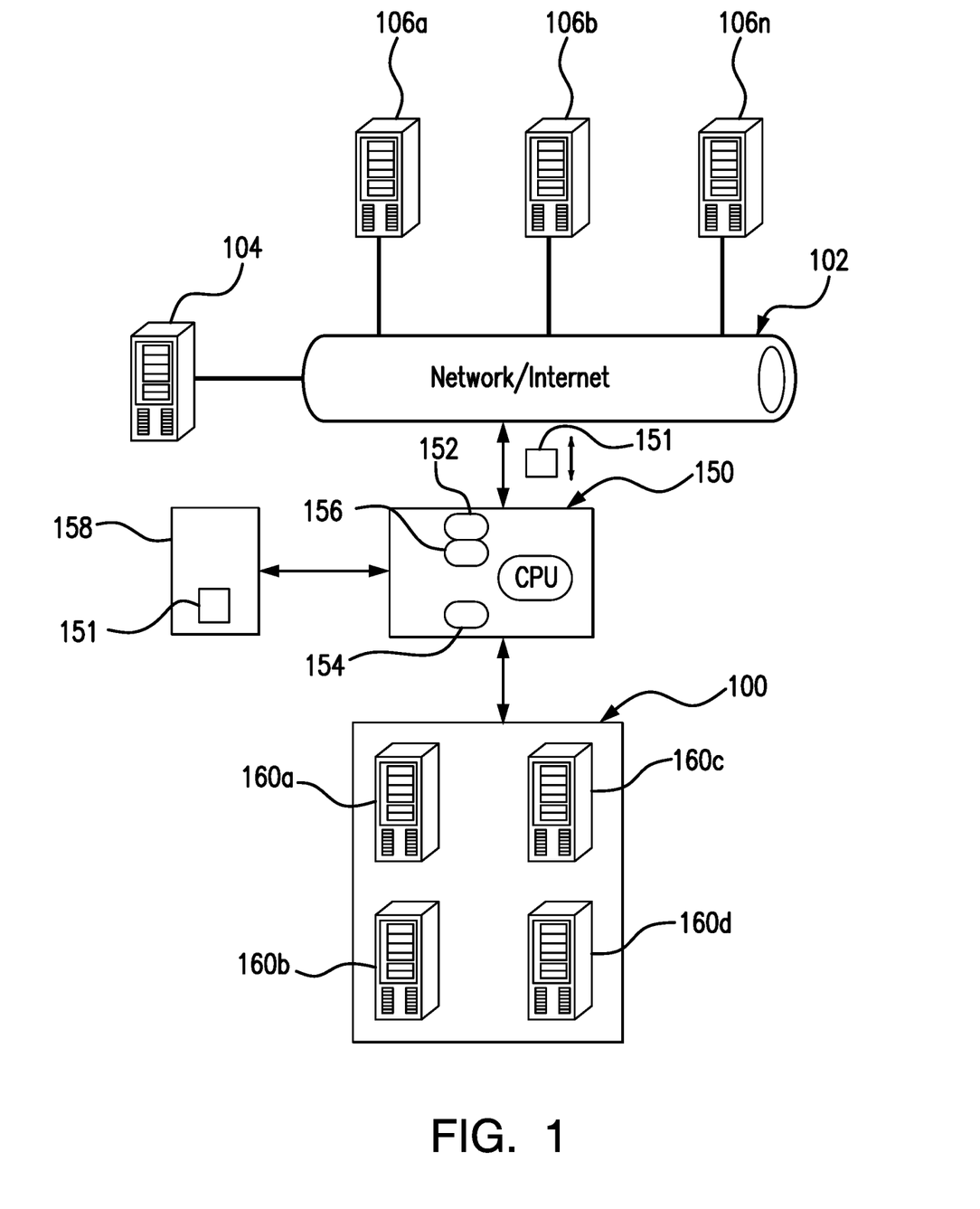
FIG. 1 illustrates an exemplary network communications system, which may be implemented in accordance with the illustrated embodiments.

Turning now descriptively to the drawings, in which similar reference characters denote similar elements throughout the several views, FIG. 1 illustrates a generalized monitoring/detection system for implementing the prioritization of packets for metering packets. The exemplary embodiment of FIG. 1 depicts the relationship between a protected network 100, protection system 150, Internet 102, and external host devices 106a-106n. It is to be appreciated that protected network 100 preferably includes a plurality of servers 160a-160n preferably consisting of a plurality of server types, including, but not limited to: Generic; Web; DNS; Mail; VoIP; VPN; RLogin; and File Servers. It is to be appreciated that in accordance with an illustrated embodiment, the protection system 150 is configured and operable to operate as an attack detection and mitigation device for preventing a denial of service attack, such as a brute force attack (in addition to other types of denial of service attacks) on targeted devices (e.g., servers 106a-106n), that may or may not reside within a protected network 100.

In a typical implementation, the external host devices 106a-106n (also referred to as external devices or host devices) attempt to connect to protected devices 160a-160n within a protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity. In a preferred embodiment, the protected network 100 is protected by a protection system 150 preferably located between the Internet 102 and the protected network 100. Usually, the protected network 100 is an enterprise network, such as a school network, business network, and government network, to list a few examples. In other embodiments, the protection system 150 is located within the Internet, service provider network or enterprise network rather than as a network edge as illustrated. It is to be appreciated that when deployed within the protected network 100, traffic is diverted to the protection system 150.

The protection system 150 preferably includes a packet processing system preferably having an external high speed network interface 152 and a protected high-speed network interface 154. Typically, these interfaces are capable of handling 1-100 Gbps, for example. System 150 may further include processing modules, such as traffic analyzer 156 that preferably process the packets received at interfaces 152 and 154.

Additionally, a central processing unit (CPU), random access memory (RAM), and one or more storage mediums 158 are preferably connected through buses and are used to further support the threat detection processing of the received packets in accordance with the illustrated embodiments. Computer code is preferably stored in storage medium and executed by the CPU of protection system 150. In one illustrated embodiment, the storage medium 158 may preferably include content-addressable memory (CAM), which is memory designed for use in very high speed searching applications. It is noted CAM memory operates different from the more commonly used random access memory (RAM). With RAM memory, a memory address is specified and the data stored at that address is returned. With CAM memory, the entire memory is searched to see if specified data are stored anywhere in the memory.

Figure 2:
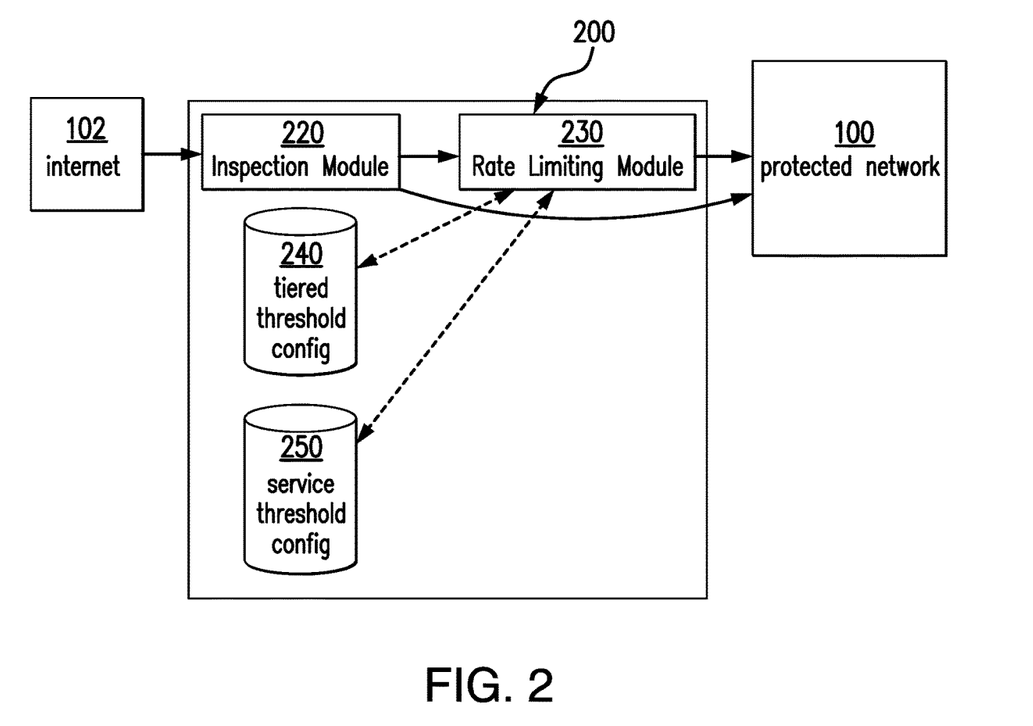
FIG. 2 is a system level diagram of a mitigation device in accordance with the illustrated embodiments.

With reference to FIG. 2, for ease of discussion purposes, shown is a generalized protection system 200 having one or more components from the protection system 150 of FIG. 1. Protection system 200 is shown to include an inspection module 220 coupled to the communication network 102 with a rate limiting module 230 coupled to an output of the inspection module 220. Both a tiered threshold configured database 240 and service threshold configured database 250 are also shown coupled the rate limiting module 230.

As shown, permitted network packets 151 flowing from the communication network 102 (e.g., packets permitted to be forwarded and thus not rate limited) flow from an output of the rate limiting module 230 to the protected network 100, the significance and details of which will be described below.

Generally, in accordance with the illustrated embodiments, the protection system 200 prevents malicious attacks (e.g., DDoS attacks) upon the protected network 100 from external host devices 106a-106n by prioritizing packets 151, preferably via Deep Packet Inspection (DPI) of the packets 151, before the rate limiter 230 operates on them so as to mitigate the occurrence of legitimate packets 151 from being dropped, queued or marked.

It is to be appreciated that while the illustrated embodiments described herein are discussed in conjunction with DDoS mitigation and DPI, the illustrated embodiments are not to be understood to be limited thereto as they may encompass applicability to Web Application Firewalls (WAF), which typically offer a rate limiting feature whereby a WAF engine may function similarly to the DPI inspection system and thus performing an analagous process/technique to what is described below.

It is to be further appreciated that rate limiting packets as described in conjunction with the illustrated embodiments is often achieved using known "token bucket algorithm" techniques whereby a token bucket starts full of tokens with tokens being removed from the bucket to represent consumption of bandwidth, and tokens being added to the bucket at a constant rate based on the configured bandwidth limit. It is to be understood that there are also known variations on the token bucket, including creating hierarchical arrangements of the token buckets, and while the certain illustrated embodiments discussed here are discussed in terms of a single "priority token bucket" with multiple limit thresholds, it is to be understood to encompass performing different operations on the bucket contingent upon a classification of data packets that are consuming tokens. It is to be further understood that while the certain illustrated embodiments are described in conjunction with a token bucket algorithm, it is to be understood that there are other suitable algorithms that could be used for determining traffic bandwidth, such as (and not limited to): fixed window counters; a sliding window log; and sliding window counters.

Figure 3:
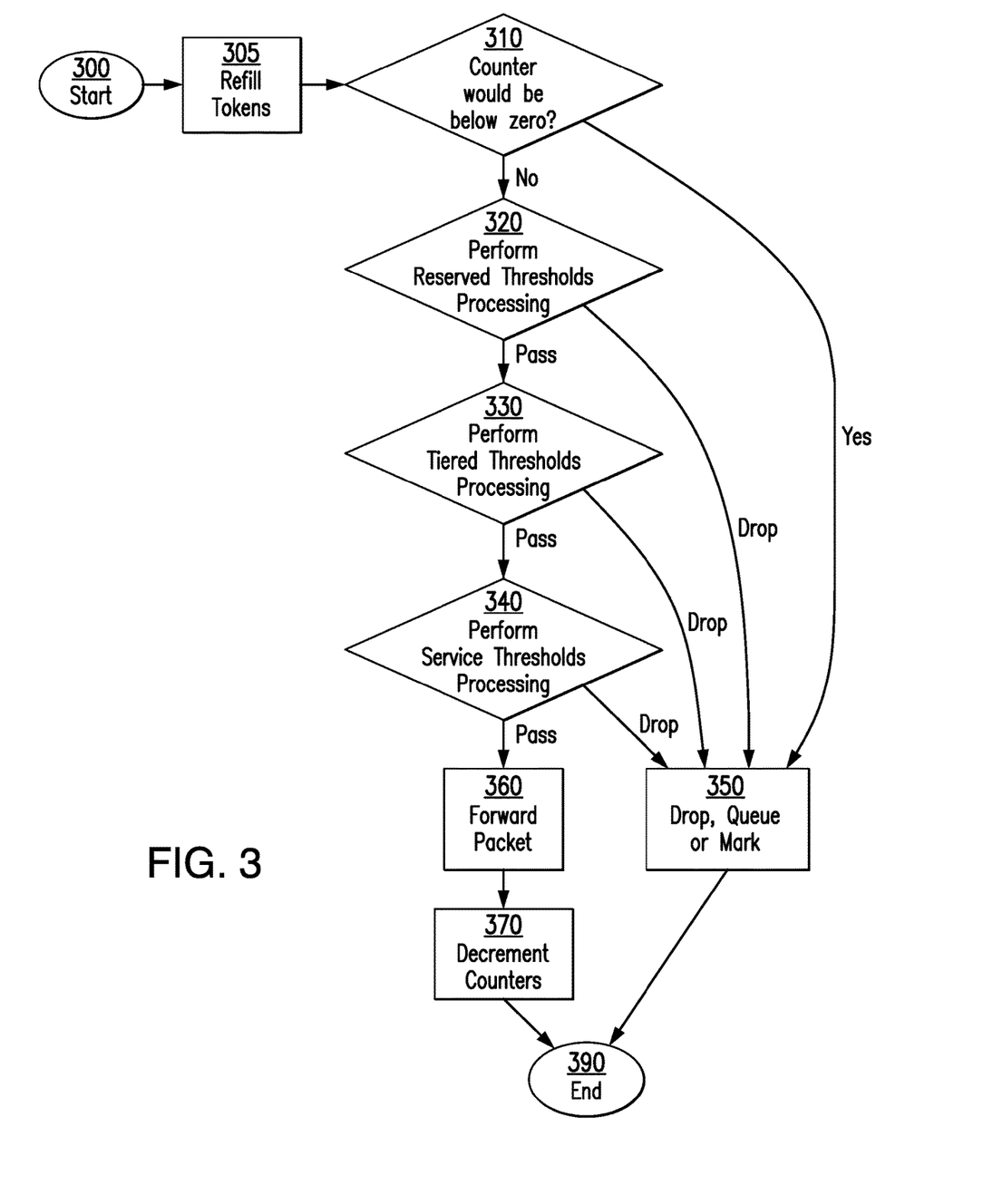
FIG. 3 is a flowchart of certain operational steps performed in accordance with certain illustrative embodiments.

With a description of a protection system 200 suitable for use with the illustrated embodiments being described above (FIGS. 1 and 2), and with continuing reference to FIGS. 1 and 2, the process for prioritizing network data packets in a network traffic flow prior to reaching a traffic limiting component provided in a network attack mitigation device will now be described with reference to FIG. 3, which depicts a generalized flowchart illustrating certain operational steps performed by the protection device 200 in accordance with illustrative embodiments. Before turning to the description of FIG. 3, it is noted that the flow diagram shown therein is described, by way of example, with reference to components shown in FIGS. 1 and 2, although these operational steps may be carried out in any system and are not limited to the scenario shown in the aforementioned figures. Additionally, the flow diagram in FIG. 3 show examples in which operational steps are carried out in a particular order, as indicated by the lines connecting the blocks, but the various steps shown in these diagrams can be performed in any order, or in any combination or subcombination. It should be appreciated that in some embodiments some of the steps described below may be combined into a single step. In some embodiments, one or more additional steps may be included.

Starting at step 300 an operator preferably configures the protection system 200 with a maximum bandwidth value for the rate limiter 230. It is to be appreciated that this bandwidth is typically prescribed to avoid exceeding the bandwidth capability of a downstream network 100 or device. It is to be further appreciated that bandwidth may be specified in bits per second (bps), packets per second (pps), connections per second (cps) or any combination of these measurements. Further, in accordance with the illustrated embodiment, the operator also configures the protection system 200 with one or more lower bandwidth "tiered thresholds" values, wherein each lower threshold is associated with a "score" that will be assigned to each data packet 151 via DPI performed on the packet 151 preferably by the packet inspection module 220. In accordance with the illustrated embodiments, lower scores represent lower priority traffic based upon certain components found in the packet 151 during its inspection, such that low scoring packets when processed by the rate limiter 230 will be dropped, queued or marked if the overall traffic rate to the network 100 exceeds this certain lower bandwidth threshold value. An arbitrary number of score/bandwidth thresholds may be set this way. Each bandwidth threshold may be specified in bits per second, packets per second, connections per second, or any combination of these. Examples of such components found in a packet 151 during a DPI inspection for providing a score value includes (and is not to be understood to be limited to) one or more of:

protocols (e.g. IPv4, IPv6, TCP, UDP, DNS, NTP, HTTPS, etc);
packet types (e.g. DNS AXFR vs. DNS Query; or membership in a given VLAN);
geographical region of source or destination (e.g. US-bound traffic, or China-sourced traffic); and
arbitrary markings applied by the DPI system; this could include a service type like "authenticated users".

The operator additionally configures the protection system 200 with settings relating to one or more "services", wherein a service is a packet classification, similar to classifications used for scoring as described above, including but not limited to protocols, packet types, geographical region of source or destination, or other arbitrary markings.

It is to be understood, in accordance with the illustrated embodiment, there are preferably two types of bandwidth limit values that can be applied to services. First, there is a "service threshold", which prevents a certain service from being transmitted to the protected network 100 when the overall bandwidth usage of the protected network 100 is above a threshold value for a certain service. Second, there is a "reserved service threshold", whereby if the overall bandwidth usage of the protected network 100 is exceeding the bandwidth value of a reserved threshold value, then only the packets belonging to a reserved service type will be permitted to pass through the rate limiter 230 so as to be forwarded to the protected network 100. For instance, as an example of a service threshold, the operator may set a pps threshold above which NTP (Network Time Protocol) will not be passed through the rate limiter 230 (e.g., the loss of a few NTP packets is not operationally significant). If the pps overall usage of the system 100 exceeds this threshold value, then any NTP packet will be dropped, queued or marked by the rate limiter 230 so as to provide bandwidth for other traffic types that are more sensitive to packet loss (e.g. DNS). And as an example of a reserved threshold, and using a scenario wherein an operator is operating a system 100 that principally provides DNS services, the operator may set a pps threshold bandwidth value above which only DNS packets 151 will be passed through the rate limiter so as to be forwarded to the protected network 100. Thus, if the pps bandwidth usage of the system 100 exceeds this pps threshold bandwidth value, then any non-DNS packet 151 will be dropped, queued or marked by the rate limiter 200. Thus, this facilitates to ensure that DNS servicing is processed by the system 100 even in the presence of a large flood of other traffic, but yet still make some effort to process those other traffic types as bandwidth allows.

It is to be appreciated that while the overall maximum bandwidth threshold value is preferably required for a protected system 100, the operator does not have to configure all types of aforesaid tiered, services, and reserved bandwidth threshold values. That is, the protection system 200 may operate with only a single service reserved threshold bandwidth value being configured/prescribed for a single service type (e.g., DNS), or with just a single tiered threshold bandwidth value being configured/prescribed by the protection system 200. However, it is to be understood the protection system 200 may be configured to concurrently process any mix of multiple tiered, services, and/or reserved thresholds bandwidth configurations.

Additionally, during system initialization, also preferably configured is a priority token bucket (PTB) data structure. This PTB has preferably has three counters: bps tokens, pps tokens, and cps tokens. Each counter is preferably initialized to maximum thresholds bandwidth values as configured by an operator. If a maximum threshold bandwidth value is not configured for any of bps, pps, or cps tokens, then the counter is unused and preferably set to MAX_INT (e.g., a large value). And for each tiered thresholds bandwidth value, the system 200 is preferably operable and configured to make an entry in a table (e.g., a lookup table) with matching the score value and the prescribed bps and/or pps threshold bandwidth value. This table enables the system 200 to look up a score and determine a bps/pps/cps bandwidth threshold value. It is to be appreciated the aforementioned table may be implemented as a tree or an array depending on the exact type of scoring measure that is emitted preferably during DPI performed on a packet in the inspection module 220. It is to be further appreciated that for each service level threshold, the system 200 preferably makes an entry in a table designating the service type (e.g., DNS) and the associated prescribed bps, pps, or cps bandwidth threshold value, whereby the service type designation may be attached to each packet inspected by the inspection module. Alternatively this may be performed by a preprocessing pass of the rate limiter module 230, whereby such a preprocessing pass enables the rate limiter module 230 to mark packets 151 based on simple rules like "udp port 53" to designate a DNS service type.

At step 305, the system 200 preferably increments the token bucket bps, pps, and cps counters according to the amount of time that has passed since a last packet 151 was processed in system 200. For instance, given a 1000 pps maximum bandwidth threshold value being configured for the protected network 100, and 100 ms that have elapsed since the a previous packet 151 was processed by system 150, then the pps counter will be incremented by 100. It is to be understood the counters are never incremented past their prescribed maximum bandwidth threshold value. Next, at step 310, when a packet 151 is received at system 200 (e.g., preferably inspection module 22), and preferably after being inspected and scored by DPI, the system 200 checks the counters whereby if decrementing the bps counter by the size of the received packet 151 would result in a value below zero for the counter, the packet 151 is then dropped, queued or marked by the rate limiting module 230 (step 350)(e.g., if decrementing the pps or cps counters by 1 would result in a value below zero, the received packet is likewise dropped, queued or marked). If the packet 151 is dropped, queued or marked (step 350) (in this step or any following step) then statistics are incremented, and processing of this packet 151 stops.

In the event the received packet 151 is not dropped, queued or marked (the counter value remains above zero (0)—e.g., the configured maximum bandwidth threshold value has not been exceeded by permitting passage of the received packet to the protected network 100), then at step 320 a determination is made preferably by the rate limiting module 230, with preferably reference to service threshold configured database 250, as to whether there are reserved service level configured thresholds, whereby the system 200 preferably processes each reserved service level threshold in turn. For each service level configured threshold, if decrementing a bps/pps/cps counter upon system 200 of the packet 151 would result in a value below the configured reserved service level configured threshold value, and the packet 151 is determined as not belonging to the service type associated with the current configured reserved service level configured threshold value, then the packet 151 is dropped, queued or marked by the rate limiting module 230 (step 350). And if decrementing a bps/pps/cps counter upon system 200 of the packet 151 would not cause the counters to fall below the aforesaid configured reserved service level threshold value, or the received packet 151 belongs to service type associated with the current configured reserved service level configured threshold value (e.g., DNS), then further similar determinations are made in turn with any further configured reserved service level threshold values. If the received packet is not caused to be dropped, queued or marked during step 320 with regards to configured reserved service level threshold values, then the process proceeds to step 330.

At step 330 a determination is made preferably by the rate limiting module 230, with preferably reference to tiered threshold configured database 240, as to whether there are any prescribed tiered configured thresholds corresponding to the received packet's 115 determined score (step 310) whereby if decrementing the bps/pps/cps counter upon reception of the packet 151 by system 200 would result in a value below the prescribed tiered configured threshold value (as preferably retrieved from tiered threshold configured database 240) corresponding to the received packet's 115 determined score, then the packet is dropped, queued or marked (step 350). And if the received packet 151 is not caused to be dropped, queued or marked during step 330 with regards to prescribed tiered configured threshold values, then the process proceeds to step 340.

At step 340, if inspection of the received packet 151 by the inspection module 220 (e.g., DPI inspection) indicated there was a service associated with the received packet 151 (e.g., DNS), then a determination is made by the rate limiting module 230, with preferably reference to service configured database 250, as to whether there are any prescribed service level configured thresholds corresponding to the received packet's 115 determined service (step 310) whereby if decrementing the bps/pps/cps counter upon reception of the packet 151 by system 200 would result in a value below the prescribed service level configured threshold value corresponding to the received packet's 115 determined service, then the packet is dropped, queued or marked (step 350).

If the received packet 151 is not dropped, queued or marked in step 340, then the packet 151 is forwarded to the protected network 100 (step 360) and the pps/bps/cps counter is decremented (as explained above) (step 370) with statistics being preferably implemented regarding the packet 151.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features.

For instance, an alternative known algorithm for performing rate limiting is the use of fixed window counters. In this algorithm a timestamp and counter are maintained, whereby the counter is initialized to zero and the timestamp is initialized to the start of the measurement granularity that is desired. For instance, if the desired limit is 1000 packets per second, the counter starts at zero and the timestamp starts at the beginning of the second during which operation starts and measures whole seconds. If the limit is one million packets per minute, then the timestamp starts at the beginning of the minute and measures whole minutes. In operation, when a packet 151 arrives at system 200: 1) if the current time is a full unit of measurement greater than the existing timestamp (e.g., if it is a new second when rate limiting per second, or if it is a new minute when rate limiting by minute), then the counter is reset to zero, the timestamp is advanced to the current time, and the packet 151 is forwarded; 2) otherwise the counter is incremented; and 3) if the counter exceeds the threshold value, the packet 151 is then dropped, queued or marked by the system 200; 4) otherwise the packet 151 is forwarded to the protected network 100. It is to be appreciated that utilization of this algorithm performs checks against multiple thresholds similar to those performed in step 330, as described above.

With regards to another alternative known algorithm for performing rate limiting is the use of a sliding window log. In this algorithm a set of timestamps are stored for each source, and a time window is established. Initially the set is empty. The time window is the period of time over which record keeping will be performed. For instance, a packet per second rate limiter may use a two second time window. In operation, when a packet 151 arrives at system 200: 1) the current timestamp is added to the set; 2) any timestamps that are older than the time window are removed from the set; 3)

if the size of the set divided by the length of the window exceeds the rate threshold, then the packet 151 is dropped, queued or marked by system 150; 4) otherwise the packet 151 is forwarded to the protected network 100.

With regards to yet another alternative known algorithm for performing rate limiting is the use of sliding window counters, which is to be understood as a hybrid of fixed and window counters and sliding window logs. In accordance with this algorithm, a mapping of timestamp to counter is maintained whereby the set is initially empty. The timestamps in the mapping are rounded to a fixed granularity, similar to what is noted above for the fixed window log, but with smaller divisions. For instance, if the rate limit is 100 packets per minute, a 1 minute window might be used, but the timestamps will be at a 1 second interval. In operation, when a packet 151 arrives at system 200: 1) if the current timestamp (rounded) is present in the mapping, the counter value is incremented. If it is not present, it is inserted in the mapping with an initial counter value of 1; 2) any timestamps outside the window are removed from the mapping; 3) all counters in the mapping are summed whereby if the sum exceeds the threshold, the packet 151 is dropped, queued or marked by the system 150; 4) otherwise the packet 151 is forwarded to the protected network 100.

The foregoing description should therefore be considered as merely illustrative of the principles, teachings and exemplary embodiments of the illustrated embodiments, and not in limitation thereof. It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method performed by a computer system having one or more processors and memory storing one or more programs for execution by the one or more processors for prioritizing network traffic flow to a protected computer network, the method comprising the steps of:
    intercepting network traffic flowing from one or more external hosts to the protected computer network, the intercepted network traffic comprising data packets;
    dropping an intercepted data packet if forwarding the intercepted data packet to the protected network would cause the value of the bandwidth of network traffic flow to the protected network to exceed a configured overall traffic bandwidth threshold value associated with the protected network;
    analyzing the intercepted data packet to determine a classification type for the intercepted data packet based upon prescribed criteria wherein each classification type has an assigned classification bandwidth threshold value, wherein the classification bandwidth threshold value is less than the overall traffic bandwidth threshold value for the protected network;
    dropping the intercepted data packet from reaching the protected network if forwarding the intercepted data packet would cause the value of the bandwidth of traffic flow to the protected network to exceed the bandwidth threshold value assigned to the determined classification type of the intercepted packets;
    determining if a reserved service threshold bandwidth classification, having an associated assigned reserve threshold bandwidth value, has been configured for the protected network whereby if yes, then determine whether the intercepted data packet belongs to the reserved service type threshold bandwidth classification such that if the overall bandwidth usage of traffic flow to the protected network exceeds the assigned reserve service threshold bandwidth value then only if the intercepted data packet is determined as belonging to the reserve service type threshold classification will it be permitted to forward to the protected network, wherein the reserved service threshold bandwidth classification relates to a certain network service; and
    determining if one or more service threshold classifications have been configured for the protected network with each service threshold classification having an assigned service threshold bandwidth value, and if yes, then determine whether the intercepted data packet belongs to the one or more service type thresholds classifications such that if it is determined that the intercepted data packet belongs to the one or more service type thresholds classifications, then the intercepted packet will only be permitted to forward to the protected network if the overall bandwidth usage of traffic flow to the protected network is less than the service threshold bandwidth value associated with the determined service type threshold classification for the intercepted data packet.

2. The method as recited in claim 1, wherein determining a classification type for the intercepted data packets includes determining a score value for the intercepted data packet based one or more contents of the intercepted data packets determined from inspection of the intercepted data packet.

3. The method as recited in claim 1, wherein analyzing the intercepted data packet further includes determining if one or more tiered threshold classifications have been configured for the protected network with each tiered threshold classification having an assigned tiered threshold bandwidth value, and if yes, then determine, based upon predetermined criteria, which of the one or more threshold classifications are associated with the determined score value for the intercepted data such that the intercepted data will only be permitted to forward to the protected network if the overall bandwidth of traffic flow to the protected network is less than the tiered threshold bandwidth value associated with the determined score value of the intercepted data packet.

4. The method as recited in claim 1, wherein a counter is associated with the bandwidth of network traffic flow to the protected network, which counter is increased when network traffic flow associated with the intercepted data packets is permitted to reach the protected network and the counter is periodically reset to zero, where the period represents the time period over which the traffic rate is measured.

5. The method as recited in claim 1, wherein a counter is associated with the bandwidth of network traffic flow to the protected network that utilizes a token bucket algorithm whereby tokens are subtracted from a token bucket to represent network traffic flow to the protected network, and tokens are periodically added to the token bucket to represent the allowable traffic flow to the protected network over that time period.

6. A computer system for prioritizing network traffic flow to a protected computer network, comprising:
    one or more data bases having memory configured to store instructions;
    a processor disposed in communication with said memory, wherein said processor upon execution of the instructions is configured to:

intercept network traffic flowing from one or more external hosts to the protected computer network, the intercepted network traffic comprising data packets;

drop an intercepted data packet if forwarding the intercepted data packet to the protected network would cause the value of the bandwidth of network traffic flow to the protected network to exceed a configured overall traffic bandwidth threshold value associated with the protected network;

analyze the intercepted data packet to determine a classification type for the intercepted data packet based upon prescribed criteria wherein each classification type has an assigned classification bandwidth threshold value, wherein the classification bandwidth threshold value is less than the overall traffic bandwidth threshold value for the protected network;

drop the intercepted data packet from reaching the protected network if forwarding the intercepted data packet would cause the value of the bandwidth of traffic flow to the protected network to exceed the bandwidth threshold value assigned to the determined classification type of the intercepted packets; and determine if a reserved service threshold bandwidth classification, having an associated assigned reserve threshold bandwidth value, has been configured for the protected network whereby if yes, then determine whether the intercepted data packet belongs to the reserved service type threshold bandwidth classification such that if the overall bandwidth usage of traffic flow to the protected network exceeds the assigned reserve service threshold bandwidth value then only if the intercepted data packet is determined as belonging to the reserve service type threshold classification will it be permitted to forward to the protected network, wherein the reserved service threshold bandwidth classification relates to a certain network service; and determine if one or more service threshold classifications have been configured for the protected network with each service threshold classification having an assigned service threshold bandwidth value, and if yes, then determine whether the intercepted data packet belongs to the one or more service type thresholds classifications such that if it is determined that the intercepted data packet belongs to the one or more service type thresholds classifications, then the intercepted packet will only be permitted to forward to the protected network if the overall bandwidth usage of traffic flow to the protected network is less than the service threshold bandwidth value associated with the determined service type threshold classification for the intercepted data packet.

7. The computer system as recited in claim 6, wherein determining a classification type for the intercepted data packets includes determining a score value for the intercepted data packet based one or more contents of the intercepted data packets determined from inspection of the intercepted data packet.

8. The computer system as recited in claim 6, wherein analyzing the intercepted data packet further includes determining if one or more tiered threshold classifications have been configured for the protected network with each tiered threshold classification having an assigned tiered threshold bandwidth value, and if yes, then determine, based upon predetermined criteria, which of the one or more threshold classifications are associated with the determined score value for the intercepted data such that the intercepted data will only be permitted to forward to the protected network if the overall bandwidth of traffic flow to the protected network is less than the tiered threshold bandwidth value associated with the determined score value of the intercepted data packet.

9. The computer system as recited in claim 6, wherein a counter is associated with the bandwidth of network traffic flow to the protected network, which counter is increased when network traffic flow associated with the intercepted data packets is permitted to reach the protected network and the counter is periodically reset to zero, where the period represents the time period over which the traffic rate is measured.

10. The computer system as recited in claim 6, wherein a counter is associated with the bandwidth of network traffic flow to the protected network that utilizes a token bucket algorithm whereby tokens are subtracted from a token bucket to represent network traffic flow to the protected network, and tokens are periodically added to the token bucket to represent the allowable traffic flow to the protected network over that time period.

11. The method as recited in claim 1 wherein dropping a packet consists of dropping a packet, queuing a packet or marking a packet as non-conforming.

12. The computer system as recited in claim 6 wherein dropping a packet consists of dropping a packet, queuing a packet or marking a packet as non-conforming.

* * * * *